United States Patent [19]

Neale

[11] Patent Number: 5,160,417
[45] Date of Patent: Nov. 3, 1992

[54] ELECTROLYTIC PROCESS FOR TREATMENT OF PHOTOGRAPHIC WASTEWATER EFFLUENT

[75] Inventor: Michael E. Neale, Welland, Canada

[73] Assignee: Environmental Systems (International) Ltd., Nassau, The Bahamas

[21] Appl. No.: 757,631

[22] Filed: Sep. 11, 1991

[51] Int. Cl.$^5$ .................. C25B 1/00; C25B 3/00; C25C 1/00
[52] U.S. Cl. .................. 204/130; 204/105 R; 204/109; 204/112; 204/131; 204/149
[58] Field of Search .................. 204/105 R, 109, 130, 204/131, 112, 149

[56] References Cited

U.S. PATENT DOCUMENTS

| | | | |
|---|---|---|---|
| 3,953,313 | 4/1976 | Levenson | 204/109 |
| 4,028,212 | 6/1977 | Bowen et al. | 204/109 |
| 4,268,619 | 5/1981 | Dunagan | 204/109 |
| 4,302,318 | 11/1981 | Mock | 204/109 |
| 4,834,850 | 5/1989 | de Nora et al. | 204/109 |

*Primary Examiner*—John Niebling
*Assistant Examiner*—David G. Ryser
*Attorney, Agent, or Firm*—Fitzpatrick, Cella, Harper & Scinto

[57] ABSTRACT

There is disclosed a system for treatment of wastewater effluent from a photographic process which produces a developer effluent, a bleach effluent and a fixer effluent. The system comprises a developer treatment zone, a bleach treatment zone and a fixer treatment zone. Within each zone, there are provided defined means of pH adjustment of the effluent and a defined electrolytic cell of electrolysis of the effluent. A process for conducting the system is also provided. The invention may be advantageously used to reduce the concentration of or eliminated chemicals contained in the effluent.

18 Claims, No Drawings

ELECTROLYTIC PROCESS FOR TREATMENT OF PHOTOGRAPHIC WASTEWATER EFFLUENT

FIELD OF THE INVENTION

The present invention relates to a system and process for treatment of wastewater effluent from a photographic process.

BACKGROUND OF THE INVENTION

Many photographic processes, including those in the graphic arts industries, utilize large amounts of water in various chemical solutions necessary in development and processing operations. This water is used to carry chemical reactants, preservatives, catalysts, accelerators and the like. The water also serves to wash away unwanted chemical by-products or unreacted chemicals from the finished film or paper. Many commerical size plants operating photographic processes can utilize as much as 150,000 U.S. gallons of water per day.

Heretofore, it has been conventional practice to discharge spent chemical solutions into municipal sewer systems and utilize fresh water to make new chemical solutions for use in the photographic process. This practice puts an enormous strain on the resources of the municipal water treatment plants. Additionally, in many countries throughout the world government authorities are carefully scrutinizing chemical discharge levels in industrial wastewater effluents. In some countries in the world, this scrutiny has lead to new legislation which bans or significantly reduces the discharge limits of chemicals in wastewater effluent. In the future, it is envisaged that there will be a complete ban on the discharge of any chemicals from industrial processes.

In the case of operators of commercial photographic processes such a ban could be fatal to the operation of the business. This is due to the fact that the photographic process industry consumes enormous amounts of fresh water and discharges a wastewater laden with environmentally hazardous heavy metals and organic compounds.

It would be desirable to have a process capable of substantially reducing the concentration of or eliminating the environmentally hazardous heavy metals and organic compounds from photographic process wastewater. Preferably, such a process would be efficient, relatively inexpensive and simple to operate.

SUMMARY OF THE INVENTION

It is an object of the present invention to provide a novel system for treating wastewater effluent from a photographic process.

It is another object of the present invention to provide a novel process for treating wastewater effluent from a photographic process.

Accordingly, in one of its aspects, the present invention provides a system for treatment of wastewater effluent from a photographic process which produces a developer effluent and a fixer effluent, the system comprising:

(i) a developer treatment zone comprising: means to permit entry of the developer effluent; means to adjust the pH of the developer effluent to greater than about 7; an electrolytic cell for treating the developer effluent comprising a first electrode and a second electrode in a spaced relationship with respect to one another; and means to adjust the pH of the developer effluent in the range of from about 6.0 to about 10.5; and (ii) a fixer treatment zone comprising: means to permit entry of the fixer effluent; an electrolytic cell for treating the fixer effluent comprising a first electrode and a second electrode in a spaced relationship with respect to one another; and means to adjust the pH of the fixer effluent in the range of from about 6.0 to about 10.5.

In another of its aspects, the present invention provides a process for treatment of wastewater effluent from a photographic process which produces a developer effluent and a fixer effluent, each such effluent comprising at least one chemical compound, the process comprising the steps of:

feeding the developer effluent to a developer treatment zone; first adjustment of the pH of the developer effluent to greater than about 7; feeding the developer effluent to an electrolytic cell comprising a first electrode and a second electrode in a spaced relationship with respect to one another; electrolyzing the developer effluent in the electrolytic cell in the presence of an electrolyte to effect a reduction in the concentration of the at least one chemical compound; and second adjustment of the pH of the developer effluent in the range of from about 6.0 to about 10.5; and feeding the fixer effluent to a fixer treatment zone comprising an electrolytic cell having a first electrode and a second electrode in a spaced relationship with respect to one another; electrolyzing the fixer effluent in the electrolytic cell in the presence of an electrolyte to effect a reduction in the concentration of the at least one chemical compound; and adjustment of the pH of the fixer effluent in the range of from about 6.0 to about 10.5.

As used throughout the present specification, the term "photographic process" is meant broadly to encompass photographic processes (e.g. colour and black and white) and graphic arts processes since wastewater effluents from such processes are similar. For example, identical or similar developing agents, preservatives, hardeners, accelerators (discussed in more detail hereinafter) and the like are used in photographic and graphic arts processes. Thus, the effluents produced by these processes are very similar. It will be appreciated that photographic process covers both film development and processing, and print processing. Further, as used throughout the present specification, the term "treatment of wastewater effluent" is meant to encompass the treatment of at least one effluent from a photographic process in a manner resulting in a substantial reduction in the concentration of at least one chemical compound or pollutant therein. Still further, as used throughout the present specification, the term "electrolysis" is meant to encompass passage of electricity through a solution to provide sufficient energy to cause an otherwise non-spontaneous reduction-oxidation ("redox") reaction. Still further, as used throughout the present specification, the term "electrolytic cell" is meant to encompass an arrangement of at least one anode/cathode pair of electrodes for conducting electrolysis.

Generally, the present system and process may be used to treat the effluent from a photographic process and graphic arts process. As is well known in the art, major components used in the development and processing of black and white photographic processes and graphic arts processes are the developer and the fixer. Thus, essential features of the present system and process include a developer treatment zone and fixer treatment zone. Also well known in the art is the use of a bleaching solution in colour photographic processes. Thus, when the effluent being treated includes effluent from a colour photographic process which produces, inter alia, a bleach effluent, it is preferred if the system of the present invention additionally includes a bleach treatment zone comprising: means to permit entry of the bleach effluent; means to adjust the pH of the bleach effluent to greater than about 7; an electrolytic cell for treating the bleach effluent comprising a first electrode and a second electrode in a spaced relationship with respect to one another; and means to adjust the pH of the bleach effluent in the range of from about 6.0 to about 10.5. In such a case, it is preferred if the process of the present invention further includes the steps of feeding the bleach effluent to a bleach treatment zone; first adjustment of the pH of the bleach effluent to greater than about 7; feeding the bleach effluent to an electrolytic cell comprising a first electrode and a second electrode in a spaced relationship with respect to one another; electrolyzing the bleach effluent in the electrolytic cell in the presence of an electrolyte to effect a reduction in the concentration of the at least one chemical compound; and second adjustment of the pH of the bleach effluent in the range of from about 6.0 to about 10.5.

DETAILED DESCRIPTION OF THE PREFERRED EMBODIMENTS

Broadly, the present invention relates to treatment of a multi-effluent stream from a photographic process. Generally, there are at least two effluents from a photographic process: developer and fixer. Accordingly, the system and process of the present invention comprise a developer treatment zone and a fixer treatment zone. Preferably, the process and system of the present invention further include a bleach treatment zone for treatment of bleach effluent from a colour photographic process. Each of these three zones will be discussed in more detail hereinafter in the context of treating effluent from a colour photographic process. It should be appreciated that, when treating effluent from a black and white photographic or graphic arts process in accordance with the present invention, the bleach treatment zone may be omitted.

Additionally, there may be other effluents from the photographic process such as stabilizer effluents, stop bath effluents, supplementary hardener effluents, print toning effluents, rinse waters (which may include one or more of the foregoing developer, bleach, fixer and other effluents) and the like. However, effluents from the developer, bleach and fixer operations of the photographic process contribute, on a volumetric basis, the majority of water requirements in the photographic process.

A key aspect of the present invention relates to the use of electrolysis in each of the developer treatment zone, the bleach treatment zone and the fixer treatment zone. The nature of electrolysis and the electrolytic cell used is not particularly restricted. Thus, a variety of electrode arrangements, including parallel plate and coaxially disposed electrodes, may be utilized. Further, the conditions (e.g. current, voltage, etc.) at which electrolysis is conducted is not particularly restricted. It is particularly preferred to utilize an electrolytic cell as described in laid-open Canadian patent application serial number 2,015,879, the contents of which are hereby incorporated by reference.

Accordingly, preferably, the electrolytic cell in any of the treatment zones of the present invention comprises a first electrode and a second electrode in a spaced coaxial relationship with respect to one another. Preferably, the ratio of the diameter of the first electrode to the diameter of the second electrode is less than about 4.50, preferably in the range of from about 1.10 to about 3.50, more preferably in the range of from about 1.10 to about 1.75, most preferably in the range of from about 1.10 to about 1.30. Preferably, the first and second electrodes are elongate and have a substantially circular cross-section. More preferably, the first electrode is perforated and the second electrode is impervious; this arrangement assists in providing cross-flow movement of the effluent to be treated in the gap between the coaxially disposed electrodes. Alternatively, the first electrode may be a perforated, hollow sphere and second electrode may be an impervious sphere, wherein the centres of the spheres are coincident.

As is well known, for electrolysis to occur, it is necessary for the liquid being electrolyzed to be conductive. Typically, an electrolyte is externally added to a liquid which is otherwise non-conductive. Preferably, the electrolyte is strong (i.e. ionizes substantially completely upon dissolution). Non-limited examples of strong electrolytes include $HNO_3$, $HClO_4$, $H_2SO_4$, $HCl$, $HI$, $HBr$, $HClO_3$, $HBrO_3$, alkali hydroxides, alkaline earth hydroxides (e.g. calcium hydroxide) and most salts (e.g. calcium chloride and sodium chloride). More preferably, the electrolyte is selected from sodium hydroxide, sodium sulphate, calcium chloride, sodium chloride, calcium hydroxide and mixtures thereof. The electrolyte may be added in any suitable form. For example, if the electrolyte is a solid, it may be dissolved in the water to be treated prior to entry into or while actually in the electrolytic cell. Alternatively, the electrolyte may be dissolved and stored as a solution in a separate vessel. The electrolyte solution would then be added, as required, to the electrolytic cell. If the electrolyte is in the form of a liquid, it may be added, as required, to the electrolytic cell either neat or in the form of a dilute aqueous solution. In the context of the present system, it will be appreciated by those skilled in the art that externally added electrolyte may not be required since the effluent from the photographic process may contain dissolved compounds which confer conductivity to the effluent. For example, the effluent from developing operations in the photographic process may contain sodium or potassium hydroxide as an accelerator and potassium bromide as a restrainer (these compounds are discussed in more detail hereinafter), and thus, this effluent possesses inherent conductivity and may not require the addition of further electrolyte. Thus, the source of the electrolyte is not particularly important provided that, regardless of source, it is present in the electrolytic cell during treatment of the effluent.

As will be apparent to those skilled in the art, various individual aspects of each of the developer treatment zone, the bleach treatment zone and the fixer treatment zone may be similar in certain instances depending on the nature of the particular effluent.

For example, each treatment zone includes electrolysis of the effluent in an electrolytic cell. Thus, in the present system and process, it is particularly preferred if the electrolytic cells in each of the developer treatment zone, the bleach treatment zone and the fixer treatment zone are coterminous. By this, it is meant that the electrolytic cell in a particular zone may serve as the electrolytic cell for one or more zones. For example, it is possible to have a common electrolytic cell for each of the developer and fixer treatment zones and an independent electrolytic cell for the bleach treatment zone. In the case of the common electrolytic cell, each of the developer and fixer effluents would be separately pre-treated in the particular treatment zone and thereafter combined into a single effluent stream. This consolidated pre-treatment effluent is then electrolyzed in a single electrolytic cell to effect a reduction in concentration of at least one chemical compound which was originally present in each of the two effluents. The manner in which the effluents are combined prior to electrolysis is not particularly restricted and is within the purview of a person skilled in the art. Post-treatment of the so-treated consolidated effluent may thereafter be conducted.

Alternatively, it will be understood that it is possible to operate each of the developer treatment zone, the bleach treatment zone and the fixer treatment zone of the present invention completely independently of one another.

The following disclosure is divided for convenience into a discussion of each treatment zone and is intended to illustrate the examples of constituents used to make up the solutions typically utilized in the various operations (i.e. developing, bleaching and fixing) of a colour photographic process and the by-products which may be produced during each operation. In the case of treating effluent from a black and white or graphic arts process, the bleach treatment zone may be omitted.

DEVELOPER TREATMENT ZONE

The developer treatment zone treats effluent from the developing operations of the photographic process. This developer effluent may comprise unused or unreacted components of the developer and usually comprises the by-products of reacted components of the developer. The exact nature of the developer effluent used in the present system and process is not particularly restricted. It is believed that the present system may be advantageously utilized to treat the developer effluent from virtually all photographic processes.

The following discussion is provided as an illustrative discussion of the components in many developers and is not intended to limit the scope of the present invention. It will be understood by those skilled in the art that various components of the developer may be substituted for or even omitted. A particularly advantageous feature of the present system is that it is not particularly restricted by the nature of the developer effluent.

The developer serves the purpose of reacting with exposed silver halide crystals in film or paper emulsions. As is well known in the art, the unexposed silver halide crystals are substantially inert to the developer thereby resulting in a negative image on the film or paper emulsion. The result of the reaction is the conversion of the exposed silver halide crystals to metallic silver.

The most important constituent in the developer is the developing agent which typically acts as a chemical reducer. In many cases, it is the developing agent, used and unused, in the developer effluent from the photographic process which presents the greatest danger as an environmental pollutant, notwithstanding the fact that the developing agent does not usually form the major component of the developer on a percent by weight basis. One of the advantages of the present invention is that it is capable of substantially reducing the concentration of virtually all known developing agents (including the non-limiting examples of developing agents discussed hereinafter) which may be present in the developer effluent.

Generally, the developing agent may be classified as either an organic developing agent or an inorganic developing agent.

A well known example of an inorganic developing agent is ferrous sulphate which, in the presence of an organic ion such as oxalate, will reduce the exposed silver halide crystals as follows:

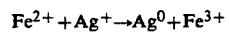

$$Fe^{2+} + Ag^+ \rightarrow Ag^0 + Fe^{3+}$$

Although ferrous sulphate works particularly well as a developing agent at a pH between about 4 and about 6, it is also capable of working at an alkaline pH. Other compounds of iron such as ferrous fluoride, ferrous oxalate and ferrous citrate have known utility as photographic developing agents. Further, it is known in the art that other compounds such as lithium hydroxide, vanadium pentoxide, ammonium vanadate (V), cuprous chloride, cuprous bromide, cuprous iodide, sodium hydrosulphite, hydrogen peroxide, hydroxylamine and hydrazine may be used as inorganic developing agents.

The majority of known and currently commercially utilized developing agents are organic in nature. Of these, the majority incorporate a benzene ring (aromatic $C_6$ ring structure). The following is a list of non-limiting examples of organic developing agents:

| Commercial/Generic Name | Chemical Name |
|---|---|
| Hydroquinone | 1,4-Benzenediol |
| Catechol | 1,2-Benzenediol |
| Pyrogallol | 1,2,3-Benzenetriol |
| p-Aminophenol | 4-Amino-1-hydroxybenzene |
| Metol, Elon, Rhodol | p-Methylaminophenol Sulphate |
| Phenidone | 1-Phenyl-3-pyrazolidinone |
| p-Phenylenediamine | 1,4-Benzendiamine |
| o-Phenylenediamine | 1,2-Benzendiamine |
| Amidol | 2,3-Diaminophenol Dihydrochloride |
| Chorquinol | Mixture of 5,7-Dichloro-8-quinolinol, 5-Chloro-8-quinolinol and 7-Chloro-8-quinolinol |
| Glycin | N-(p-Hydroxyphenyl)glycine |
| Metoquinone | Mixture of Hydroquinone and p-Monomethylaminophenol |
| Gallic acid | 3,4,5-Trihydroxybenzoic Acid |
| m-Cresol | 3-Methylphenol |
| — | Sodium 1-Amino-2-naphthol-6-sulphonate hemipentahydrate |
| — | 1-Amino-4-N-dimethyl-aminobenzene |
| — | Paraformaldehyde |
| Benzyl alcohol | Phenylmethanol |

It will of course be appreciated that for many of the foregoing developing agents, the corresponding salts thereof, where applicable, may be useful. Moreover, it will be appreciated that the developer may comprise one or more of the foregoing (or other) developing agents. For example, it is well known that the combined use of Metol and hydroquinone as developing agents provides a synergistic developing effect.

The developer effluent may contain both unused developing agent and the by-product of the developing agent/silver halide reaction. For example, if hydroquinone is used as the developing agent and the silver halide is silver bromide, the development reaction generally proceeds as follows:

$$C_6H_4(OH)_2 + 2AgBr + 2OH^- \rightarrow C_6H_4O_2 + 2Ag + 2Br^- + 2H_2O$$

In this scenario, hydroquinone has been oxidized to benzoquinone. Oxidation to a corresponding ketone or aldehyde during the development process is characteristic of many organic developing agents. The present system and process may be used advantageously to reduce substantially the concentration of unused developing agent and the oxidized by-product thereof in the developer effluent.

In order for most organic developing agents to operate efficiently, it is usually necessary to maintain the pH of the solution at greater than 7. Accordingly it is known in the art to incorporate an accelerator in the developer. Generally, the accelerator is an alkali or a mixture of compounds designed to maintain the pH of the developer solution at a desired level during the actual development process. The following is a non-limiting list of known accelerators together with an indication of the pH at which they will maintain the developer solution:

| Accelerator | pH (approx.) |
|---|---|
| Sodium (or potassium) hydroxide | 12+ |
| Sodium carbonate | 11.5 |
| Sodium metaborate (Kodalk) | 10.8 |
| Borax | 9.6 |
| Sodium sulphite | weak alkali |

Many accelerators are used in conjunction with a buffering agent which serves the purpose of maintaining the availability of $OH^-$ ions during the development process. Typically, the buffering agent is a salt of a weak acid. Non-limiting examples of suitable such buffering agents include: boric acid, sodium phosphate, sodium metaborate, sodium sulphite and sodium bicarbonate. It will be appreciated that it is possible to utilize a mixture of accelerators in the developer.

In order to prevent the developing agent from being oxidized by air and thus, losing its ability to reduce the exposed silver halide crystals, it is usual to employ a preservative in the developer solution. The preservative most commonly employed for this purpose with organic developing agents is sodium sulphite. Other non-limiting examples of preservatives which have proven utility include: potassium metabisulphate, sodium bisulphite and sodium metabisulphite. It will be appreciated that it is possible to utilize a mixture of preservatives in the developer.

In certain instances, a simple developer comprising a developing agent, an activator and a preservative may be unable or inadequate to differentiate between exposed and unexposed silver halide crystals on the film with the result that the resulting image is somewhat fogged. To overcome this problem, it is conventional to add a restrainer to the developer. Typically, the restrainer is a soluble halide such as potassium bromide. Another known restrainer is benzotriazole.

Various developer compositions are known and are available commercially whereas others are proprietary. For example, a developer composition commercially available under the tradename Kodak D-8 comprises:

sodium sulphite (preservative)
hydroquinone (developing agent)
sodium hydroxide (accelerator)
potassium bromide (restrainer)
This developer is known to produce fast results with high contrast.

Another known developer composition is commercially available under the tradename Kodak D-23 and comprises only:
p-methylaminophenol sulphate (developing agent)
sodium sulphite (preservative/mild accelerator)
This developer is known to be slower, working producing relatively low contrast results.

Yet another known developer composition is commercially available under the tradename Kodak D-76 and comprises:
p-methylaminophenol sulphate (developing agent)
hydroquinone (developing agent)
sodium sulphite (preservative)
borax (accelerator)
This developer is made for more general use than Kodak D-23 and D-8, and provides average speed and average contrast results.

As stated hereinabove, the exact nature of the developer effluent is not usually known since many developers are proprietary and the developer effluent may contain varying amounts of various unreacted components of the developer.

In the present system and process, the developer effluent is passed from the photographic process operation (film or paper) to a developer treatment zone. The developer treatment zone comprises means to permit entry therein of the developer effluent. As will be known to those skilled in the art, this means may comprise a series of holding tanks, valves, feed lines and the like. Preferably the means to permit entry of the developer effluent comprises means to dilute the developer effluent. It is particularly preferred to dilute the developer effluent such that it is from about 4 to about 10, most preferably from about 7 to about 10, times more dilute than the original developer effluent. The manner in which the effluent is diluted is not particularly restricted and is within the purview of a person skilled in the art.

The developer treatment zone also comprises means to adjust the pH of the developer effluent to a value greater than about 7, preferably to a value in the range of from about 9 to about 12, more preferably to a value in the range of from about 10 to about 11. The manner in which this is accomplished is not particularly restricted and is within the purview of a person skilled in the art. Preferably, the pH is chemically adjusted (i.e. by addition of a chemical to the developer effluent), more preferably by addition of a suitable amount of an alkali, most preferably by the addition of a suitable amount of sodium hydroxide.

The developer treatment zone further comprises an electrolytic cell for treatment of the pH-adjusted developer effluent. The preferred aspects of the electrolytic cell have been discussed hereinabove. In this treatment zone it is preferred to utilize a second electrode coaxially disposed with a first electrode, wherein the second electrode functions as the anode during electrolysis and made of a material which is substantially inert during electrolysis. Non-limiting examples of suitable materials for the second electrode of this embodiment include platinum, graphite, titanium, niobium, inert alloys and the like. It will be appreciated that such inert materials may be coated on otherwise sacrificial materials such as stainless steel and the like. Further, it is preferred to electrolyze the pH-adjusted developer effluent at a current in the range of from about 75 to about 150 Amperes and to maintain the voltage of the liquid at less than about 20 volts. The manner in which the voltage is maintained at this level is not particularly restricted and includes adding sodium sulphate to the liquid.

After electrolysis the pH of the treated developer effluent is adjusted as described hereinabove such that it is in the range of from about 6.0 to about 10.5. The manner in which this adjustment is accomplished is not particularly restricted. Preferably, the pH is lowered, if required, by carbon dioxide sparging, acid (e.g. sulphuric acid, hydrochloric acid, etc.) addition and the like, or the pH is increased, if required, by addition of a suitable amount of an alkali such as calcium hydroxide, calcium oxide, flyash and the like.

BLEACH TREATMENT ZONE

As is well known in the art, bleaching solutions are used during the processing and development of colour photographic film or paper. Generally, bleaching is conducted after development and prior to fixing.

The following discussion is provided as an illustrative discussion of bleaching solutions and is not intended to limit the scope of the present invention. It will be understood by those skilled in the art that various components of bleaching solutions may be substituted for or even omitted. A particularly advantageous feature of the present system is that it is not particularly restricted by the nature of the bleach effluent.

The use of a bleaching solution lies at the heart of the difference between developing and processing colour photographic film or paper as compared to black and white photographic film or paper. Specifically, in black and white photographic film or paper the silver is directly responsible for the image eventually developed and processed on the film or paper. In contrast, in colour photographic film or paper, the relatively monotone silver image is unwanted since the colour image is produced by a reaction between the developing agent and colour coupler contained in each layer of a three emulsion layer (blue-green-red) on the surface of the film or paper. The amount of colour image formed in each emulsion layer is in direct proportion to the amount of developed (i.e. metallic) silver in that emulsion layer on the film or paper. Accordingly, in the development and processing of colour photographic film or paper, the exposed silver must be rendered removable after formation of the colour image; this is the main purpose of the bleaching agent.

While there are vast numbers of formulations used for bleaching solutions, they generally fall into three categories.

The first class of bleaching solutions falls into the category of simple bleaches. These bleaches convert the developed silver to soluble silver salts without affecting the unexposed, undeveloped silver halide on the film. A non-limiting example of such a simple bleach is a mixture of potassium dichromate and sulphuric acid.

The second class of bleaching solutions falls into the category of rehalogenating bleaches. Rehalogenating bleaches contain a milder oxidizing agent (when compared to simple bleaches) such as iron-containing oxidizing agents such as potassium ferricyanide, together with potassium bromide. If the rehalogenating bleach includes an iron-containing oxidizing agent, it is quite common to include a chelating agent such as ethylenediaminetetraacetic acid (EDTA), which serves to prevent iron ions from reacting to form insoluble compounds and thus be precipitated out of solution before they can oxidize the silver on the film or paper surface. In this scenario, the iron is "tied up" by the chelating agent, for example in the form of ferric ammonium ethylenediaminetetraacetic acid, and is released slowly in the presence of an "activator" compound to perform its intended function. In use, rehalogenating bleaches serve to reconvert the developed silver to silver halide which can be removed along with unexposed, undeveloped silver halide in the fixer operations of the photographic process (see below).

The third class of bleaching solutions falls into the category of bleach-fixing solutions which additionally contain oxidizing agent such as thiosulphate. Bleach-fixing solutions serve to bleach (convert developed silver to a removable form) and fix (remove undeveloped silver and removable silver, if any, from the bleach step) the film in a simultaneous manner.

As stated hereinabove, the exact nature of the bleach effluent is not usually known since many bleaching solutions are proprietary and since the bleach effluent may contain varying amounts of various unreacted components of the bleaching solution.

In the present system and process, the bleach effluent is passed from the photographic process operation (film or paper) to a bleach treatment zone. The bleach treatment zone comprises means to permit entry therein of the bleach effluent. As will be known to those skilled in the art, this means may comprise a series of holding tanks, valves, feed lines and the like. Preferably the means to permit entry of the bleach effluent comprises means to dilute the bleach effluent. It is particularly preferred to dilute the bleach effluent such that it is from about 4 to about 10, most preferably from about 7 to about 10, times more dilute than the original bleach effluent. The manner in which the effluent is diluted is not particularly restricted and is within the purview of a person skilled in the art.

The bleach treatment zone also comprises means to adjust the pH of the bleach effluent to a value greater than about 7, preferably to a value in the range of from about 9 to about 12, more preferably to a value in the range of from about 10 to about 11. The manner in which this is accomplished is not particularly restricted and is within the purview of a person skilled in the art. Preferably, the pH is chemically adjusted (i.e. by addition of a chemical to the bleach effluent), more preferably by addition of a suitable amount of an alkali, most preferably by the addition of a suitable amount of sodium hydroxide.

The bleach treatment zone further comprises an electrolytic cell for treatment of the pH-adjusted bleach effluent. The preferred aspects of the electrolytic cell have been discussed hereinabove. In this treatment zone it is preferred to utilize a second electrode coaxially disposed with a first electrode, wherein the second electrode functions as the anode during electrolysis. Further, it is preferred to electrolyze the pH-adjusted bleach effluent at a current in the range of from about 75 to about 150 Amperes and to maintain the voltage of the liquid at less than about 20 volts. The manner in which the voltage is maintained at this level is not particularly restricted and includes adding sodium sulphate to the liquid.

The choice of material used to construct such a first and second electrode is not particularly restricted. However, in treating bleach effluent, it is particularly preferred to use two types of first and second electrodes pairs. One type (Type A) of first and second electrode pair comprises a first electrode (preferably the cathode) made of stainless steel and a second electrode (preferably the anode) made of a material which is substantially inert during electrolysis. The other type (Type B) of first and second electrode pair comprise a first electrode (preferably the cathode) made of lead, a lead/tin alloy, nickel, zinc and the like, and a second electrode (preferably the anode) made of a material which is substantially inert during electrolysis. Non-limiting examples of suitable materials for the second electrode of this embodiment include those discussed hereinabove for the developer treatment zone. It will be appreciated that such inert materials may be coated on otherwise sacrificial materials such as stainless steel and the like. In this embodiment of Type A and Type B electrodes, it is preferred to connect the Type A electrodes to an electrical source capable of providing a current of from about 65 to about 85 Amperes, more preferably from about 70 to about 80 Amperes, and the Type B electrodes to an electrical source capable of providing a current in the range of from about 5 to about 20 Amperes, more preferably from about 10 to about 15 Amperes. This arrangement of electrodes is particularly advantageous for treating bleach effluent comprising nitrate which becomes reduced at the Type B electrodes. The so-produced ammonia may be subsequently oxidized to produce harmless nitrogen gas.

A particularly preferred aspect of the bleach treatment zone of the present system and process relates to the treatment of bleach effluent including a rehalogenating bleach which comprises a combined iron-containing oxidizing agent/chelating agent, preferably ferric ammonium ethylenediaminetetraacetic acid. When such a bleach effluent is to be treated, it is preferred to pretreat the effluent after dilution thereof, if required, and prior to pH adjustment thereof to pH of greater than about 7. This pretreatment comprises the steps of: (a) adjusting the pH of the bleach effluent to a value greater than about 10, more preferably to a value of about 12, resulting in precipitation of the iron as a hydroxylated ferric compound; and (b) reducing the pH of the bleach effluent to a value of less than about 3, more preferably to a value of about 1.5, resulting in precipitation of substantially pure EDTA. Regarding step (a) of the pretreatment, the manner in which the pH is adjusted is not particularly restricted. Since the pH of the effluent from (b) is relatively acidic, the pH thereof may be suitably adjusted by the addition of an appropriate amount an alkali such as lime, calcium hydroxide, potassium hydroxide or sodium hydroxide. It is also preferred to separate the hydroxylated ferric compound precipitate produced in step (a) prior to step (b) of the pretreatment; this may be accomplished by a suitable physical separation technique such as filtration, decantation and the like. Regarding step (b) of the pretreatment, the manner in which the pH is adjusted is not particularly restricted. Since the pH of the effluent is high from step (a) of the pretreatment, the pH may be suitably lowered by the addition of an appropriate amount of an acid such as sulphuric acid and the like. It should by appreciated that ethylenediaminetetraacetic acid precipitated in step (b) of the pretreatment is crystalline and of substantial purity to be a saleable product.

The precipitated ethylenediaminetetraacetic acid is preferably removed from the effluent after completion of step (b) of the pretreatment. As in step (a) of the pretreatment, this may be accomplished by a suitable physical separation technique such as filtration, decantation and the like. After removal of the precipitate from step (b) of the pretreatment, the bleach effluent may then be dispatched for pH adjustment to a value greater than about 7 and further processing in the electrolytic cell as described hereinabove. It will of course be appreciated by those skilled in the art that steps (a) and (b) in the pretreatment step may be reversed so that ethylenediaminetetraacetic acid is precipitated prior to the hydroxylated ferric compound.

After electrolysis, the pH of the treated bleach effluent is adjusted as described hereinabove such that it is in the range of from about 6.0 to about 10.5. The manner in which this adjustment is accomplished is not particularly restricted. Preferably, the pH is adjusted by carbon dioxide sparging or by addition of a suitable acid such as sulfuric acid or the like (reduces pH), or by addition of a suitable amount of an alkali such as lime, calcium hydroxide, potassium hydroxide or sodium hydroxide (increases pH).

FIXER TREATMENT ZONE

After development, the film is then passed through a water bath, optionally including an acidic (usually acetic acid) stop bath, for the purpose of halting the development process. The developed film or paper contains unexposed, undeveloped silver halide. This unexposed, undeveloped silver halide is removed in the fixer operations of a photographic process. Generally, the fixer serves to convert the halide to soluble silver complexes which remain dissolved in the fixer solution. Thus, the soluble silver complexes may be washed out of the emulsion layer, baryta layer or paper fibers thereby rendering the resultant negative or print more stable.

The following discussion is provided as an illustrative discussion of the components in many fixers and is not intended to limit the scope of the present invention. It will be understood by those skilled in the art that various components of the fixer may be substituted for or even omitted. A particularly advantageous feature of the present system and process is that there is no particular restriction to the nature of the fixer effluent capable of being treated.

The active ingredient in the fixer responsible for chemical conversion of the unexposed, undeveloped silver halide crystals to soluble silver complexes is the fixing agent. Non-limiting examples of well known fixing agents utilized in many photographic processes include sodium thiosulphate, ammonium thiosulphate and sodium thiosulphate/ammonium chloride mixtures. The latter two fixing agents are known to provide rapid fixing results. Generally, the fixing agent reacts with unexposed, undeveloped silver halide crystals as follows:

$$AgBr + 2S_2O_3^{2-} \rightarrow [Ag(S_2O_3)_2]^{3-} + Br^-$$

Most fixers are acidic in nature to neutralize any alkali remaining after the development process and also to facilitate the operation of hardeners, if present in the fixer. The acid typically used for this purpose is acetic acid although it is possible to use others.

As in the case of developers discussed hereinabove, it is conventional to utilize a preservative in the fixer. Use of a preservative serves to inhibit disintegration of the fixer by acid. A commonly used preservative for this purpose is sodium sulphite which reacts with any free sulphur in solution to form thiosulphate (fixing agent).

Many fixers also act as hardeners to prevent excessive swelling and softening of the film or paper emulsion during the washing process; this protects both the wet and dry emulsions from damage. A commonly used hardener for this purpose is potassium alum. The use of such a hardener is optional and, indeed, many fixers are known as "nonhardening fixers".

Finally, it is conventional to incorporate a buffer in the fixer if the fixer is also to serve the purpose of a hardener. The buffer serves to maintain the acidic nature of the fixer which leads to efficient operation of the hardener. If the fixer is a "nonhardening fixer", the buffer may be omitted.

In the present system and process, the fixer effluent is passed from the photographic process operation to a fixer treatment zone. The fixer treatment zone comprises means to permit entry therein of the fixer effluent. As will be known to those skilled in the art, this means may comprise a series of holding tanks, valves, feed lines and the like. Preferably the means to permit entry of the fixer effluent comprises means to dilute fixer effluent. It is particularly preferred to dilute the developer effluent such that it is from about 4 to about 10, most preferably from about 7 to about 10, times more dilute than the original fixer effluent. The manner in which the effluent is diluted is not particularly restricted and is within the purview of a person skilled in the art.

The fixer treatment zone preferably further comprises means to adjust the pH of the fixer effluent to a value either: (a) less than about 3, preferably less than about 2; or (b) greater than about 6, preferably greater than about 7, more preferably to a value in the range of from about 8 to about 9. The manner in which this is accomplished is not particularly restricted and is within the purview of a person skilled in the art. Preferably, the pH is chemically adjusted (i.e. by addition of a chemical to the fixer effluent), more preferably by addition of a suitable amount of an alkali, most preferably by the addition of a suitable amount of sodium hydroxide, or an acid, as appropriate.

Adjustment of the pH of the fixer effluent as described in the preceding paragraph may result in precipitation of elemental sulphur from the effluent. This elemental sulphur may be physically separated (e.g. by filtration techniques and the like) from the effluent or simply, and preferably, retained in the effluent during the subsequent stages of the fixer treatment zone.

The fixer treatment zone further comprises an electrolytic cell for treatment of the pH-adjusted fixer effluent. The preferred aspects of the electrolytic cell have been discussed hereinabove. In this treatment zone it is preferred to utilize a second electrode coaxially disposed with a first electrode, wherein the second electrode functions as the anode during electrolysis and made of a material which is substantially inert during electrolysis. Non-limiting examples of suitable materials for the second electrode of this embodiment include those discussed above for the electrolytic cell of the developer treatment zone. It will be appreciated that such inert materials may be coated on otherwise sacrificial materials such as stainless steel and the like. Further, it is preferred to electrolyze the pH-adjusted fixer effluent at a current in the range of from about 75 to about 150 Amperes and to maintain the voltage of the liquid at less than about 20 volts. The manner in which the voltage is maintained at this level is not particularly restricted and includes adding sodium sulphate to the liquid.

After electrolysis, the pH of the treated fixer effluent is adjusted as described hereinabove such that it is in the range of from about 6.0 to about 10.5. The manner in which this adjustment is accomplished is not particularly restricted. Preferably, the pH is adjusted by carbon dioxide sparging or by addition of a suitable acid such as sulphuric acid and the like (reduces pH); or by addition of a suitable amount of an alkali such as calcium hydroxide (increases pH).

During electrolysis, it is quite normal to observe progressively increasing amounts of precipitated material. In the treatment of fixer effluent, this precipitated material usually contains elemental silver and/or insoluble silver salts. Preferably, the precipitated material produced during electrolysis is physically separated from the electrolyzed effluent after electrolysis. The means of accomplishing the separation is not particularly restricted and is within the purview of a person skilled in the art. For example, the precipitated material may filtered from the electrolyzed effluent. Alternatively, a series of decantation tanks may be provided to separate the precipitated material. In both cases the resulting filtrate or supernatant has a reduced concentration of at least one chemical compound originally in the effluent.

The fixer effluent may contain both unused fixing agent and the soluble silver complex by-product, usually silver thiosulphate ion, of the fixer process. The present system and process may be used advantageously to reduce substantially the concentration of both of these chemicals.

Currently, some commercial consumers of fixer dispatch spent fixer off-site for the purpose of electrowinning silver (electrolysis to recover substantially pure silver) from the soluble silver complex in an effort to rationalize operating costs associated with conducting the photographic process. The present system and process are particularly advantageous since they can be used for the dual purpose of reducing significantly the concentration of silver in the effluent and providing precipitated silver in a form which is easily refined to obtain substantially pure silver.

The system and process of the present invention may be expanded to treat further the effluents from the photographic process.

For example, prior to the pH adjustment after electrolysis of the developer effluent, the bleach effluent and the fixer effluent in their respective treatment zones, it may be desirable to subject the effluent to a de-sulphating. De-sulphating is well known in the art and generally comprises precipitation of sulphate via the addition of compounds giving rise to a cationic species capable of forming an insoluble sulphate. Non-limiting examples of such compounds include: calcium hydroxide, barium hydroxide, flyash, alumina cement and the like. De-sulphating is desirable where sulphate has been used as an electrolyte or in pH adjustment steps, or is inherent in the effluent being treated.

The following Examples are intended to illustrate aspects of the present system and process, and are not intended to limit the scope of the present invention.

Waste water effluent was obtained from a commercial colour photographic process. The effluent was obtained as separate effluents from each of the developer, bleach and fixer operations of the photographic process. Each effluent was treated individually in accordance with the present system as will be described in more detail hereinafter.

EXAMPLE 1

Treatment of Developer Effluent

Prior to treatment, the developer effluent was diluted ten-fold with water (i.e. diluted such that it was ten times as dilute as starting effluent).

The pH of the developer effluent was adjusted to 10 by the addition of a suitable amount of sodium hydroxide.

850 ml of the diluted, pH-adjusted developer effluent (dark greenish blue in colour) was then fed to an electrolytic cell comprising a coaxially disposed pair of electrodes. The outer electrode was made of stainless steel and was an elongate, hollow, perforated cylinder having an internal diameter of 0.875 in (2.22 cm). The inner electrode was made of platinum coated on niobium coated on copper and was an elongate, solid rod having a diameter of 0.75 in (1.91 cm). Thus, the ratio of the diameter of the outer (i.e. first) electrode to the diameter of the inner (i.e. second) electrode was 1.17. In this arrangement of electrodes, the outer electrode functioned as the cathode, while the inner electrode functioned as the anode. The electrodes were connected to a power supply capable of providing a current of 75 Amperes and a voltage of 40 Volts.

The electrolytic cell was operated to provide a current of 75 Amperes and an average voltage of 12 Volts for a period of 90 minutes. After operation of the electrolytic cell, the liquid appeared as a clear, virtually colourless solution.

The sulphate concentration of the electrolyzed sample was determined pursuant to Method No. 426C of Standard Methods (16th Edition) published by American Public Health Association (APHA). On the basis of this sulphate concentration, the effluent was subjected to de-sulphating by the addition of a sub-stoichiometric amount of barium hydroxide resulting in precipitation of barium sulphate which was filtered off.

The pH of the electrolyzed sample was then adjusted to 8.3 by the addition of a sufficient amount of carbon dioxide.

The treated developer effluent was then tested to quantify the reduction of various pollutants therein. The tests were performed pursuant to the following Standard Methods, *supra*,

| Method No. | Parameter |
|---|---|
| 508B | COD (Chemical Oxygen Demand) |
| 303B | Silver |
| 424F | Phosphorus |
| 426C | Sulphate |
| 204A | Colour |
| 507 | BOD (Biochemical Oxygen Demand) |
| 303B | Iron |

The results are provided in Table 1.

TABLE 1

| Parameter | Untreated Effluent | Treated Effluent | Reduction (%) |
|---|---|---|---|
| COD (ppm) | 68,000 | 36 | 99.9 |
| Silver (ppm) | 0.3 | <0.05 | >83.3 |
| Phosphorus (ppm) | 104 | <1 | >99.0 |
| Sulphate (ppm) | 10,400 | 800 | 92.3 |
| Colour (Pt—Co) | 3,800 | 22 | 99.4 |
| BOD (ppm) | 23,000 | 78 | 99.7 |
| Iron (ppm) | 0.7 | <0.1 | >85.7 |

As is evident from the results presented in Table 1, the concentrations of all pollutants were significantly reduced (>80%). More importantly, the concentration of the pollutants was reduced sufficiently to permit discharge of the effluent in the municipal sewer system or recycle back to developer or other operations of the photographic process.

EXAMPLE 2

Treatment of Bleach Effluent

In this Example, two electrolytic cells were used. One electrolytic cell contained electrodes (Type A) which were the same as those used in Example 1. The electrolytic cell contained an outer, hollow, cylindrical, perforated electrode made of a lead/tin alloy and an inner, solid, cylindrical electrode made of platinum coated on niobium coated on copper. The outer electrode had an inside diameter of 0.875 in (2.22 cm) and the inner electrode had a diameter of 0.75 in (1.91 cm) corresponding to a ratio of electrodes of 1.17. Use was made of the same power supply used in Example 1. The bleach effluent treated in this Example was known to contain an iron-containing oxidizing compound and ethylenediaminetetraacetic acid.

The bleach effluent (reddish-brown in colour) was diluted two-fold with water (i.e. diluted such that it was twice as dilute as starting effluent).

Prior to treatment in the electrolytic cell, 1750 ml of the diluted bleach effluent was pretreated as follows. Initially, the pH was adjusted to 12 by addition of a suitable amount of sodium hydroxide which resulted in precipitation of a hydroxylated iron compound (ferric hydroxide in this case). The precipitate was removed by filtration and the pH of the filtrate was adjusted to 1.5 by the addition of sulphuric acid resulting in precipitation of ethylenediaminetetraacetic acid. This precipitate was removed by filtration and the pH of the filtrate was adjusted to 11.8 prior to entry thereof into the electrolytic cell.

Electrolysis of 850 ml of the pre-treated bleach effluent was conducted in the electrolytic cell containing the Type A electrodes at 75 Amperes and an average of 10 Volts for 60 minutes. During this step of electrolysis, the liquid became clear and virtually colourless. Thereafter, electrolysis was conducted in the electrolytic cell containing the Type B electrodes at 15 Amperes and an average of 7 Volts for 60 minutes. During this step of electrolysis, there was virtually no observable change in the liquid.

The electrolyzed liquid was subjected to de-sulphating in the same manner as described in Example 1.

The pH of the electrolyzed sample was then adjusted to 8.7 by the addition of a sufficient amount of carbon dioxide.

The treated bleach effluent was then tested to quantify the reduction of various pollutants therein. The tests were performed pursuant to the following Standard Methods, supra, not previously identified:

| Method No. | Parameter |
|---|---|
| 418C | Nitrate-N |
| 420A | TKN |
| 505 | TOC |
| 417B | $NH_3$—N |

Bromide, bromate and ethylenediaminetetraacetic acid (EDTA) concentrations were determined according to known ion chromatographic methods. The results are presented in Table 2.

TABLE 2

| Parameter | Untreated Effluent | Treated Effluent | Reduction (%) |
|---|---|---|---|
| BOD (ppm) | 34,000 | <4 | >99.9 |
| COD (ppm) | 274,000 | <2 | >99.99 |
| Iron (ppm) | 14,000 | 0.2 | >99.9 |
| Bromide (ppm) | 37,100 | 35 | >99.9 |
| Bromate (ppm) | 1.71 | 1.1 | 35.7 |
| Nitrate-N (ppm) | 368 | 6.2 | 98.3 |
| EDTA (ppm) | 2,200 | 1.1 | 99.95 |
| TKN (ppm) | 39,700 | 0.12 | >99.99 |
| TOC (ppm) | 30,650 | <10 | >99.95 |
| Colour (Pt—Co) | 25,000 | 1 | >99.99 |
| $NH_3$—N (ppm) | 19,600 | 0.06 | >99.99 |
| Sulphate | 2,200 | 276 | 87.5 |

EXAMPLE 3

Treatment of Fixer Effluent

In this Example, use was made of the same electrolytic cell and power supply as used in Example 1.

1000 ml of fixer effluent was adjusted to pH 1.5 by addition of a suitable amount of sulphuric acid resulting in precipitation of elemental sulphur and residual silver. The precipitate was filtered off and the filtrate was diluted ten-fold with water (i.e. diluted sample was ten times more dilute than starting effluent).

900 ml of the diluted fixer effluent was introduced into the electrolytic cell. Electrolysis was conducted at 50 Amperes and an average of 8.5 Volts for a period of 60 minutes. Thereafter the effluent was subjected to de-sulphating in accordance the procedure described in Example 1.

The pH of the electrolyzed sample was then adjusted to 8.4 by the addition of a sufficient amount of calcium hydroxide.

The treated fixer effluent was then tested to quantify the reduction of various pollutants therein. The additional parameter tested for was sulphite which was determined iodometrically. The results are provided in Table 3.

TABLE 3

| Parameter | Untreated Effluent | Treated Effluent | Reduction (%) |
|---|---|---|---|
| COD (ppm) | 68,700 | 130 | >99.9 |
| BOD (ppm) | 480 | 41 | 91.5 |
| Colour (Pt—Co) | 348 | 8 | 97.7 |
| Sulphate (ppm) | 3,300 | 940 | 71.5 |
| Sulphite (ppm) | 40,300 | 5 | >99.98 |
| $NH_3$—N (ppm) | 36,640 | 3.6 | >99.99 |
| Silver (ppm) | 1,705 | <0.05 | >99.99 |

As in the previous Examples, the concentration of pollutants tested for was significantly reduced. The treated effluents from Examples 1–3 may be recycled back to the photographic process or simply discharged into the municipal sewage system.

What is claimed is:

1. A process for treatment of wastewater effluent from a photographic process which produces a developer effluent comprising developer pollutants and a fixer effluent comprising fixer pollutants to effect a substantial reduction in said developer pollutants and said fixer pollutants, said process comprising the steps of:

feeding said developer effluent to a developer treatment zone; first adjustment of the pH of said developer effluent to greater than about 7; feeding said developer effluent to an electrolytic cell comprising a first electrode and a second electrode in a spaced relationship with respect to one another; electrolyzing said developer effluent in the electrolytic cell in the presence of an electrolyte to precipitate said developer pollutants (i) substantially avoiding deposition thereof on either of said first electrode and said second electrode, and (ii) effecting a substantial reduction thereof in said developer effluent; and second adjustment of the pH of said developer effluent in the range of from about 6.0 to about 10.5; and feeding said fixer effluent to a fixer treatment zone; feeding said fixer effluent to an electrolytic cell comprising a first electrode and a second electrode in a spaced relationship with respect to one another; electrolyzing said fixer effluent in said electrolytic cell in the presence of an electrolyte to precipitate said fixer pollutants (i) substantially avoiding deposition thereof on either of said first electrode and said second electrode, and (ii) effecting a substantial reduction thereof in said fixer effluent; and, thereafter, adjustment of the pH of said fixer effluent in the range of from about 6.0 to about 10.5.

2. The process defined in claim 1, further comprising the step of feeding bleach effluent comprising bleach pollutants from said photographic process to a bleach treatment zone; first adjustment of the pH of said bleach effluent to greater than about 7; feeding said bleach effluent to an electrolytic cell comprising a first electrode and a second electrode in a spaced relationship with respect to one another; electrolyzing said bleach effluent in said electrolytic cell in the presence of an electrolyte to precipitate said bleach pollutants (i) substantially avoiding deposition thereof on either of said first electrode and said second electrode, and (ii) effecting a substantial reduction thereof in said bleach effluent; and second adjustment of the pH of said bleach effluent in the range of from about 6.0 to about 10.5.

3. The process defined in claim 2, wherein said electrolytic cell in each of said developer treatment zone, said bleach treatment zone and said fixer treatment zone comprises a first electrode and a second electrode in a spaced coaxial relationship with respect to one another.

4. The process defined in claim 3, wherein in each of said developer treatment zone, said bleach treatment zone and said fixer treatment zone, the ratio of the diameter of said first electrode to the diameter of said second electrode is less than about 4.50.

5. The process defined in claim 4, wherein the first adjustment of the pH of said developer effluent is to a value in the range of from about 10 to about 11.

6. The process defined in claim 4, wherein the first adjustment of the pH of said bleach effluent is to a value in the range of from about 10 to about 11.

7. The process defined in claim 4, wherein prior to electrolysis thereof, pH of said fixer effluent is adjusted to a value in the range of either (a) from about 8 to about 9 or (b) less than about 3.

8. The process defined in claim 4, wherein said bleach effluent comprises ferric ammonium ethylenediaminetetraacetic acid and prior to said first adjustment of pH thereof, said bleach effluent is subjected to a pretreatment step comprising: (a) adjusting the pH of said bleach effluent to a value greater than about 10 to precipitate a hydroxylated ferric compound; and (b) adjusting the pH of said bleach effluent from (a) to a value less than about 3 to precipitate ethylenediaminetetraacetic acid.

9. The process defined in claim 8, further comprising the step of removing said hydroxylated ferric compound prior to (b) of said pretreatment step.

10. The process defined in claim 8, further comprising the step of removing said ethylenediaminetetraacetic acid after (b) of said pretreatment step.

11. The process defined in claim 3, wherein in each of said developer treatment zone, said bleach treatment zone and said fixer treatment zone, the ratio of the diameter of said first electrode to the diameter of said second electrode is in the range of from about 1.10 to about 3.50.

12. The process defined in claim 3, wherein in each of said developer treatment zone, said bleach treatment zone and said fixer treatment zone, the ratio of the diameter of said first electrode to the diameter of said second electrode is in the range of from about 1.10 to about 1.75.

13. The process defined in claim 3, wherein in each of said developer treatment zone, said bleach treatment zone and said fixer treatment zone, the ratio of the diameter of said first electrode to the diameter of said second electrode is in the range of from about 1.10 to about 1.30.

14. The process defined in claim 3, wherein in each of said developer treatment zone, said bleach treatment zone and said fixer treatment zone, said first electrode is perforated and said second electrode is impervious to provide substantially cross-flow movement of effluent in the spacing between said first electrode and said second electrode.

15. The system defined in claim 2, wherein said electrolytic cell in said developer treatment zone, said electrolytic cell in said bleach treatment zone and said electrolytic cell in said fixer treatment zone are coterminous.

16. The process defined in claim 2, further comprising the step of diluting said bleach effluent such that it is from about 4 to about 10 times more dilute prior to the first adjustment of pH thereof.

17. The process defined in claim 1, further comprising the step of diluting said developer effluent such that it is from about 4 to about 10 times more dilute prior to the first adjustment of pH thereof.

18. The process defined in claim 1, further comprising the step of diluting said fixer effluent such that it is from about 4 to about 10 times more dilute prior to the first adjustment of pH thereof.

* * * * *

UNITED STATES PATENT AND TRADEMARK OFFICE
CERTIFICATE OF CORRECTION

PATENT NO. : 5,160,417
DATED : November 3, 1992
INVENTOR(S) : Michael E. Neale

It is certified that error appears in the above-identified patent and that said Letters Patent is hereby corrected as shown below:

AT [57] ABSTRACT

Line 8, "cell of" should read --cell for--.
    Line 11, "eliminated" should read --eliminate--.

COLUMN 8

Line 12, "slower, working" should read --slower-working,--.

COLUMN 11

Line 4, "electrodes" should read --electrode--.

COLUMN 14

Line 27, "may filtered" should read --may be filtered--.

COLUMN 17

Line 45, "accordance" should read --accordance with--.

Signed and Sealed this

Sixteenth Day of November, 1993

Attest:

BRUCE LEHMAN

*Attesting Officer*  *Commissioner of Patents and Trademarks*